Figure 1:
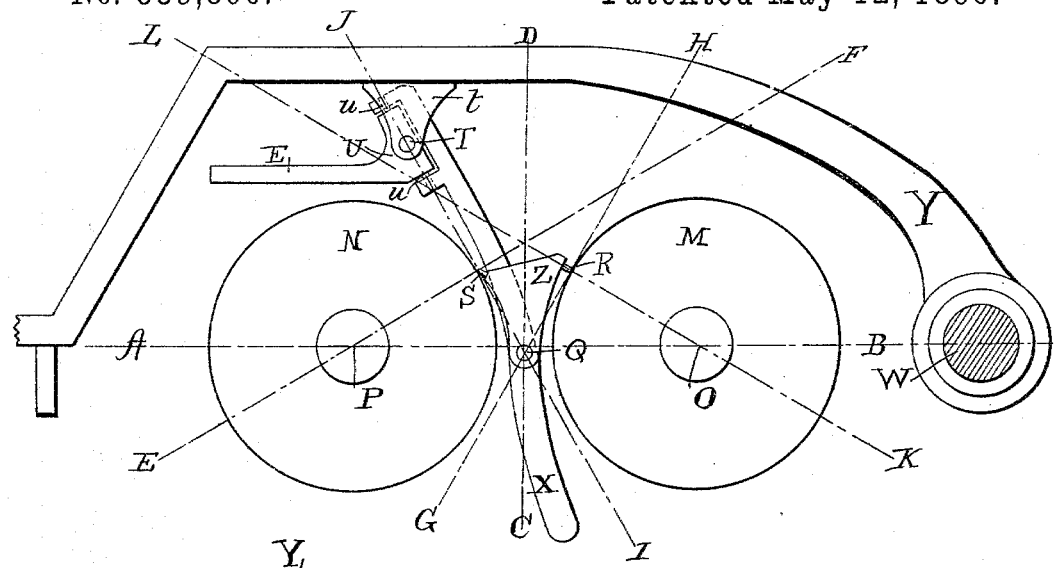

(No Model.)

T. H. MACDONALD.
DEVICE OR APPARATUS FOR DUPLICATING GRAPHOPHONE RECORDS.

No. 559,806. Patented May 12, 1896.

Witnesses
W. Rees Edelen
Reeve Lewis

Inventor
Thos. H. Macdonald
by Pollard Manro
his attorneys

UNITED STATES PATENT OFFICE.

THOMAS H. MACDONALD, OF BRIDGEPORT, CONNECTICUT, ASSIGNOR TO THE AMERICAN GRAPHOPHONE COMPANY, OF WEST VIRGINIA.

DEVICE OR APPARATUS FOR DUPLICATING GRAPHOPHONE-RECORDS.

SPECIFICATION forming part of Letters Patent No. 559,806, dated May 12, 1896.

Application filed December 4, 1895. Serial No. 571,083. (No model.)

*To all whom it may concern:*

Be it known that I, THOMAS H. MACDONALD, of Bridgeport, Connecticut, have invented a new and useful Improvement in Devices or Apparatus for Duplicating Graphophone-Records, which is fully set forth in the following specification.

This invention has reference to devices or apparatus for duplicating graphophonic records. In such apparatus as heretofore constructed the reproducing and recording styles have usually been carried by separate levers connected by suitable intermediate links, diaphragms, &c., the pressure requisite to cut the duplicate record being transmitted through the pivot-points of the levers by suitable weights or other equivalent means. Such devices not only require very painstaking adjustment, but owing to their delicacy of structure are very susceptible to injury.

The object of my present invention is to provide a much simplified construction of a substantial character and which will duplicate records with greater precision than the duplicating devices heretofore in use. In accordance therewith the reproducing and recording styles are rigidly connected, both being carried by a lever to which vibratory movements are imparted by the master record and whereby the reproducing-style is caused to cut in a blank a duplicate corresponding to the master record. This lever is pivoted to an arm, which is arranged (at an inclination or otherwise) so that the weight thereof falls upon the point of pivot to hold the styles in contact with their respective cylinders. Said arm, which may for distinction be called the "pressure-arm," is pivoted at one end to swing therefrom and is also swiveled, permitting movement about a longitudinal axis. The pressure exerted by the pressure-arm may and is preferably counteracted to some extent by a weight operating from the pivot-point of said arm, thus permitting the latter to be made much heavier and more substantial and giving it greater inertia than would otherwise be permissible with a device of this general construction. As the blank cylinder revolves against the cutting-point of the recorder a groove is cut in its surface exactly corresponding to that of the master record, the reproducing-point following and accurately transmitting to the recorder the movements due to variations in the depth of cut of the master record. The recording-point is in the line of the axis on which the pressure-arm is swiveled longitudinally, so that the reproducing-point can find its adjustment accurately without disturbing the position of the recorder.

Details of arrangement and what is considered the best embodiment of my invention in an operative machine will be clearly understood by reference to the accompanying drawings, forming part of this specification, in which—

Figure 2:
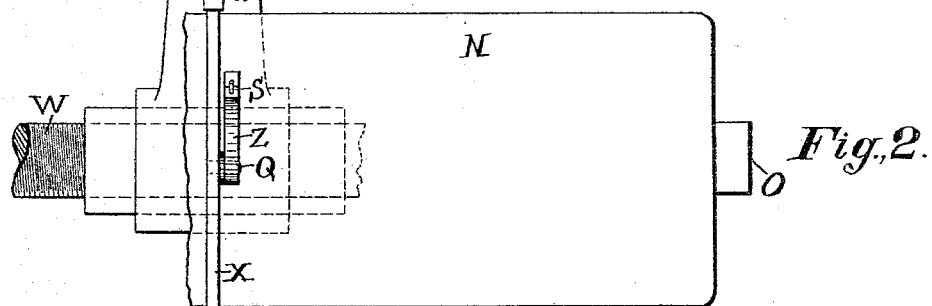

Figure 1 represents a cross-section of an apparatus embodying the invention; Fig. 2, an elevation, partly in section; and Fig. 3, a view similar to Fig. 1, illustrating another form of apparatus embodying the invention.

Referring to Figs. 1 and 2, Y represents a traveling supporting-arm engaging a feed-screw W at one end and sliding on a rail V at its other end. M is the master-record cylinder, and N the blank cylinder for receiving the duplicate, said cylinders being horizontally arranged parallel to each other and carried by suitable mandrels connected with and driven at the same speed by suitable mechanism in a well-known manner. Z is a lever carrying the reproducing-point R and the recording-point S. This lever is pivoted at Q to pressure-lever X, arranged at an inclination and swiveled upon the pins $u$ $u$, projecting into sockets in a block U to turn about a longitudinal axis. The block U, carrying a weighted arm E, counteracting to some extent the pressure exerted by the lever X upon the points R and S, is pivoted at T to a bifurcated bracket $t$, depending from the arm Y. The weighted lever or pressure-arm X is thus pivoted at T to swing in a plane at right angles to the axis of the record-cylinders and on the points $u$ to oscillate slightly on an axis tangent to cylinder N.

To state with geometrical precision that relation and arrangement of the parts which has in actual practice been found to produce the best results, but to which the invention is not limited, it is preferable to locate the pivot-point Q of lever Z at the intersection of two corresponding tangent lines I J and G H, said point of intersection being near a horizontal line A B, projected through the axes O and P of the cylinders M and N, while the recording and reproducing points S and R bear against the cylinders at the respective tangent points of the said lines I J and G H. The swivel-pins $u$ $u$ are also in the tangent line I J in which the recording-point is located, so that the oscillating movement of the arm X is about the line I J as an axis. Consequently the reproducing-point R can find a lateral adjustment without affecting the position of the recording-point S. It will be noted that the pivot-points T and Q and the swivel-points $u$ $u$ are all in line with the recording-point S, the object of this disposition being to prevent distortion.

From the foregoing description it will be understood that the weight of arm X, swinging from pivot-point T and acting upon fulcrum Q of lever Z, supplies the pressure in the direction of line C D for holding the points R and S in contact with the cylinders M and N, which pressure it is found desirable for the reasons indicated to counteract to some extent by the weight E. Thus as the cylinders rotate in the direction of the arrows the variations in depth of the master record cause the point R to move in the direction of the radial line L K of cylinder M, vibrating the lever Z on the pivot Q, and in turn imparting movements to the point S in the direction of the radial line E F of cylinder N, and thereby causing it to cut a record in the blank N exactly corresponding to the master record.

Figure 3:
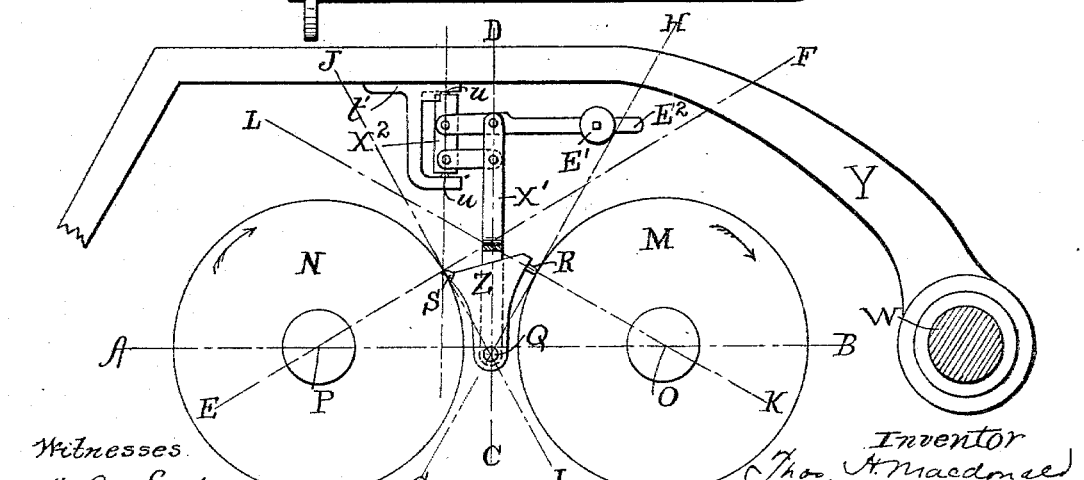

Referring now to Fig. 3, the lever or support Z for the recording and reproducing points is, as before, pivoted at Q to a pressure-arm X', the point Q being at the intersection of the two tangent lines I J and G H, drawn from the respective points of contact of the recorder and reproducer with cylinders M N. Arm or lever X' is depressed by the counterweight E', adjustable on lever $E^2$. In order to secure parallelism of movement of lever X', it is made part of a pantograph system, the parallel arm $X^2$ being swiveled at points $u$ $u$ in the bracket $t'$, so as to permit a slight oscillation, as in the arrangement shown in Fig. 1. This axis of oscillation is in a line which intersects recording-point S. The operation of the apparatus shown in Fig. 3 is substantially as already described with reference to Figs. 1 and 2.

The disposition and arrangement of the several parts have been described with minuteness of detail for the purpose of exhibiting the invention in the best practical forms known to me.

It will be obvious to skilled mechanics that these details may be varied within wide limits without departing from the spirit of the invention.

Having thus described my invention, what I claim as new, and desire to secure by Letters Patent, is—

1. A device for duplicating graphophone-records comprising, in combination, a lever mounted to vibrate between a master record and a blank, a reproducing and a recording style carried by said lever, and means for applying pressure to the lever whereby said styles are respectively maintained in contact with the master record and blank, substantially as described.

2. A duplicating apparatus comprising, in combination, a support mounted to vibrate between a master record and a blank, a reproducing and a recording style secured rigidly to said support, and a pivoted pressure-arm carrying the fulcrum of the support and holding the styles with yielding pressure respectively in contact with the master record and blank, substantially as described.

3. In a graphophonic duplicating device, the combination with a suitable support, of a lever carrying the reproducing and recording styles, said lever being mounted to have a vibratory movement between a master record and a blank, and an oscillatory movement on an axis intersecting the point of the recording-style, substantially as described.

4. In a duplicating device, the combination with a supporting-arm, of a lever carrying the reproducing and recording styles and mounted to vibrate between the master record and blank, a pressure-arm pivotally supported from said supporting-arm, carrying the fulcrum of said lever, and swiveled to oscillate slightly about a longitudinal axis, substantially as described.

5. A duplicating apparatus comprising in combination a lever carrying the reproducing and recording styles, and mounted to vibrate between the master record and blank, and a pivotally-supported weighted arm carrying the fulcrum of the lever and swiveled to oscillate about a longitudinal axis passing through the recording-style and the fulcrum of the lever, substantially as described.

6. In a duplicating apparatus, the combination of a lever carrying the reproducing and the recording styles and mounted to vibrate between the master record and blank, a pivoted weighted arm carrying the fulcrum of said lever, and means for partially counteracting the weight of said arm, substantially as described.

7. In a duplicating apparatus, the combination with a supporting-arm, of a pivoted lever carrying the reproducing and recording styles and mounted to vibrate between the master record and the blank, a block pivotally connected to said supporting-arm, a weighted pressure-arm swiveled to said block and carrying the pivot of the lever, and a weighted arm on the block acting to partially counteract the pressure of the arm, substantially as described.

8. In a duplicating apparatus, the combination of the weighted pressure-arm, a lever fulcrumed thereon between the master record and blank, a reproducing-point and a recording-point pressed by the weight of said arm into contact with the said master record and blank, respectively, the fulcrum of said lever being at the intersection of tangent lines drawn respectively from the points of the recorder and reproducer, substantially as described.

In testimony whereof I have signed this specification in the presence of two subscribing witnesses.

THOMAS H. MACDONALD.

Witnesses:
G. L. HUBBELL,
CLEMENT MARCH.